INVENTOR.
BURDETTE W. BELLINGER
BY
ATTORNEY

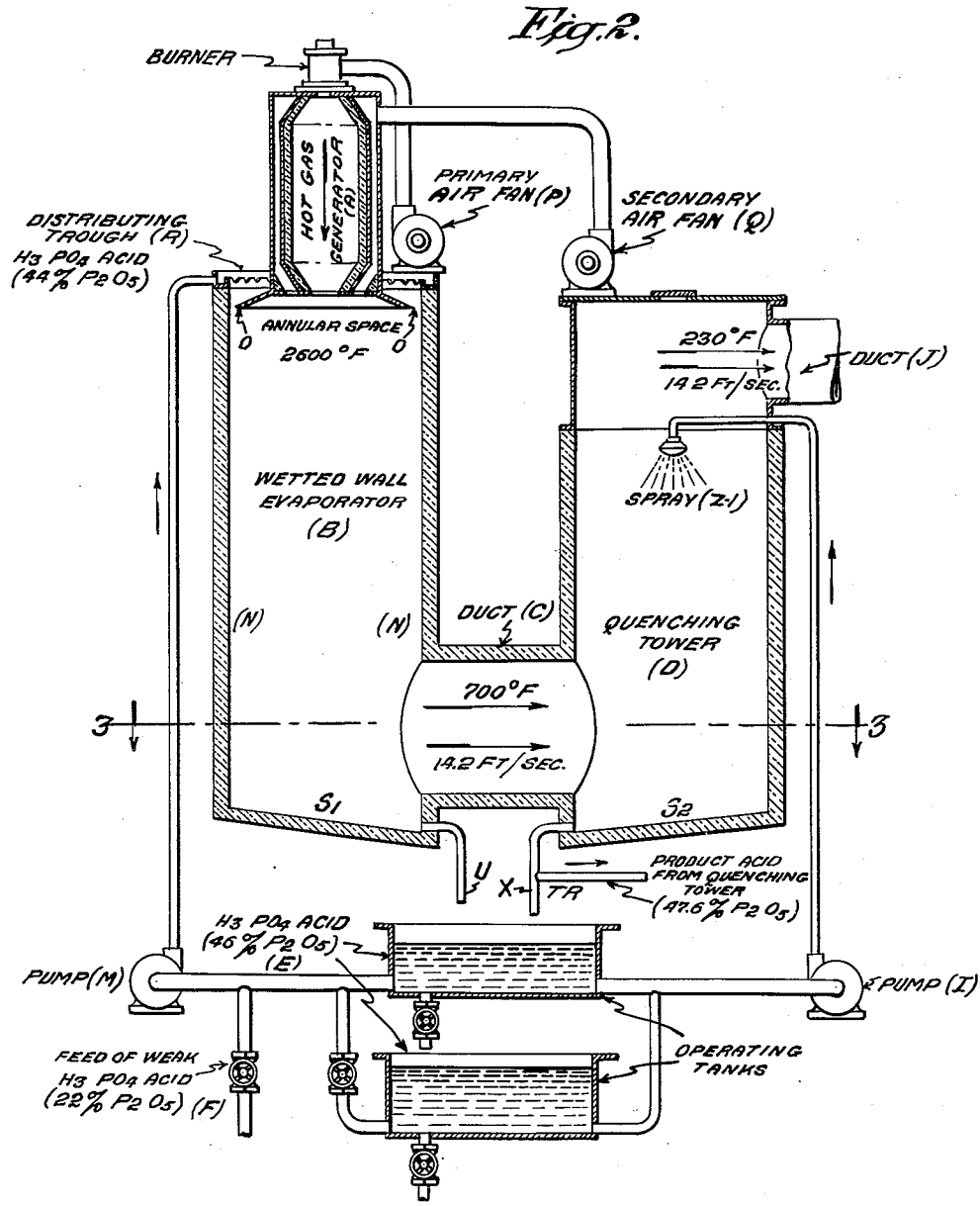

Sept. 23, 1952   B. W. BELLINGER   2,611,681
PROCESS OF CONCENTRATING PHOSPHORIC ACID
Filed Dec. 1, 1948   3 Sheets-Sheet 3
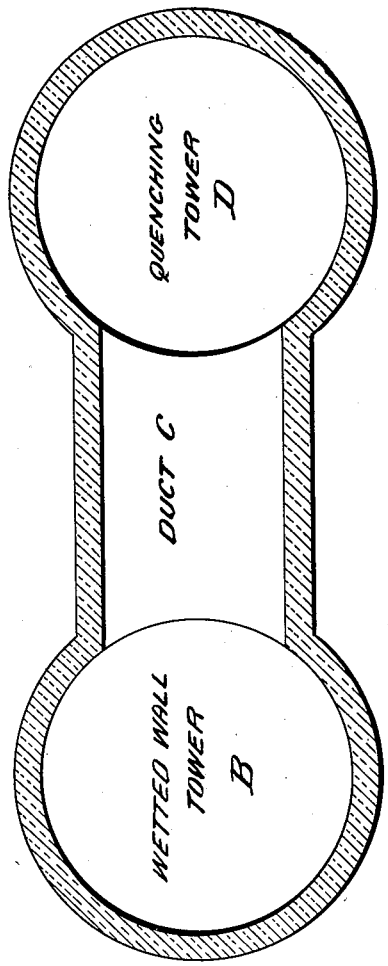
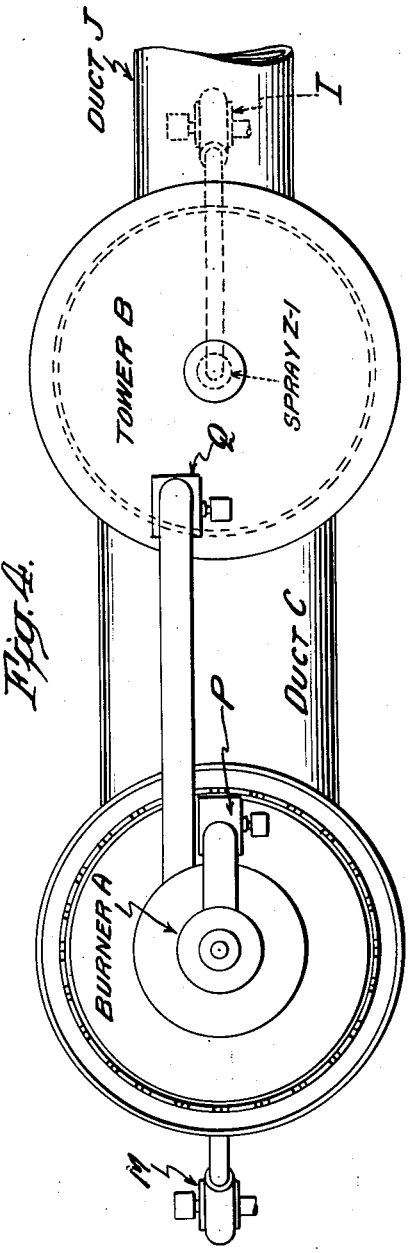
INVENTOR.
BURDETTE W. BELLINGER
BY
ATTORNEY Patented Sept. 23, 1952

2,611,681

UNITED STATES PATENT OFFICE 2,611,681

PROCESS OF CONCENTRATING PHOSPHORIC ACID

Burdette W. Bellinger, Tampa, Fla., assignor to Tennessee Corporation, New York, N. Y., a corporation of New York Application December 1, 1948, Serial No. 62,951

3 Claims. (Cl. 23—165)

The present invention relates to the art of concentrating phosphoric acid, and, more particularly, to an improved process of concentrating phosphoric acid efficiently on an industrial scale and with a minimum loss of phosphorous pentoxide.

It is an object of the present invention to provide an improved process of concentrating phosphoric acid from about 20% $P_2O_5$ to about 50% $P_2O_5$ with a small loss of $P_2O_5$ which is evolved to the atmosphere as a dense white cloud of phosphoric acid mist.

A further object of the present invention is to provide an improved process of concentrating phosphoric acid on an industrial scale efficiently and with a minimum of $P_2O_5$ losses.

The invention also contemplates the provision of an improved process of concentrating phosphoric acid which is capable of being carried into practice for the production of a commercial product on an industrial scale.

Moreover, the present invention provides an improved process of concentrating phosphoric acid involving the exposure of the acid to be concentrated while in turbulent flow to the action of flame and/or hot gas whereby concentration occurs without localized dehydration and losses.

Furthermore, the present invention provides a novel combination wetted wall evaporator and quenching tower for carrying the present process into practice.

Other objects and advantages of the present invention will become apparent from the following description taken in conjunction with the accompanying drawings, in which:

Fig. 2 depicts a vertical sectional view of the novel combination wetted wall evaporator and quenching tower;

Fig. 3 is a cross section taken on the lines 3—3 of Fig. 2; and

Fig. 4 shows a top plan view of the novel combination wetted wall evaporator and quenching tower.

Figure 1:
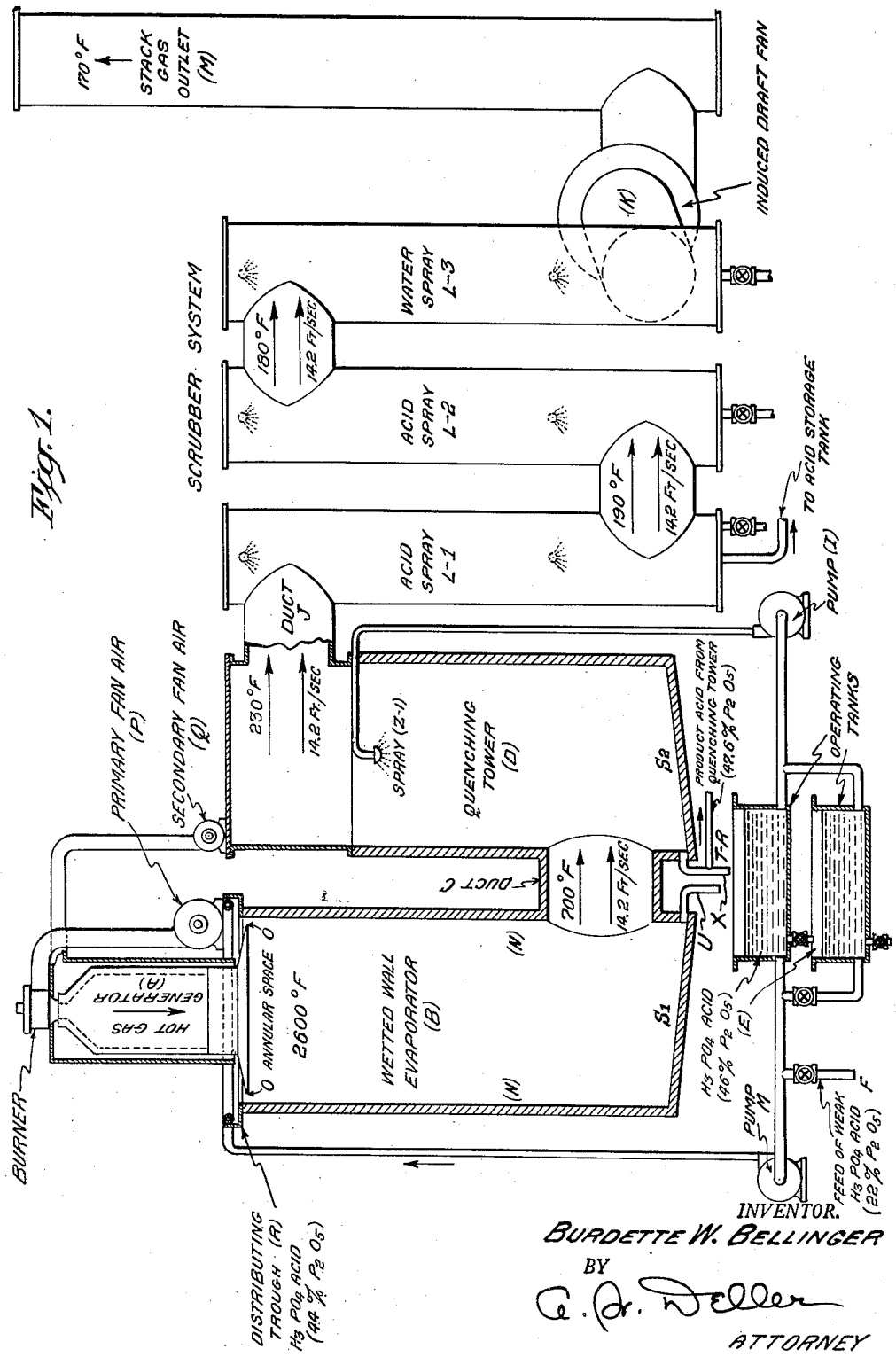
Fig. 1 illustrates diagrammatically an elevation view, partly in section, of equipment capable of carrying the invention into practice industrially.

I have discovered that when phosphoric acid is exposed to the action of a flame or hot gas without agitation, severe localized surface evaporation takes place with the formation of a partially dehydrated phosphoric acid film. Upon continued exposure to the flame or hot gas, the dehydration of the film goes to completion, resulting in the formation of pyro, and eventually, the sublimation of metaphosphoric acid, which is evolved in the gaseous state and which becomes hydrated again as a dense white cloud of $H_3PO_4$ mist on contact with moisture. I have also found that when the boiling point of the acid is reached, a fine spray of $H_3PO_4$ results, which becomes dehydrated immediately upon exposure to the flame or hot gas to meta-phosphoric acid. The same process of dehydration takes place when phosphoric acid comes in contact with excessively hot spots within a concentrator system, in the form of a liquid, spray, foam, or mist.

It has been discovered that when phosphoric acid is exposed while in turbulent flow to the action of a flame or hot gas, concentration takes place throughout substantially the entire volume of acid, without localized dehydration and losses, as long as the acid remains below its boiling point.

Referring particularly to Fig. 1, phosphoric acid of approximately 22% $P_2O_5$ is introduced into the system at inlet F at the rate of about 564 lbs. per minute where it mixes with the re-circulation acid from the operating tank E. The resulting mixture of acid is pumped by pump M from inlet F' to the novel wetted wall distributing trough R, where it flows continuously and completely over the inside wall of the tower, as an uninterrupted acid film of variable thickness N. This uninterrupted film of phosphoric acid always covers the inside wall so that no bare spots occur. An annular space O is provided for this purpose between hot gas generator A and wetted wall evaporator B.

Heat exchange between the acid film N and the hot gases within the wetted wall evaporator accounts for the major portion of the total water to be evaporated. In practice, it has been found that more than 50% of the total water, for example, about 66%, can be evaporated in the said evaporator. Partially concentrated acid flows all the way down the wall, across the sloping bottom S-1 of the tower, and into an operating tank E.

From tank E, acid is pumped by pump I to spray Z-1 and sprayed into quenching tower D, which conditions the volatilized gases for scrubbers L-1, L-2, and L-3 in the scrubber system, as well as completes the concentration of the acid by driving off a minor portion of the total water to be evaporated. In practice, less than 50%, for example about 33%, of the total water can be evaporated in the said tower. In the quenching tower, the acid flows across the sloping bottom S-2 and into an exit trough T—R, from which a portion is withdrawn as the product acid (47.6% P₂O₅). The remainder is returned to one of the operating tanks E where it is mixed with the acid from the wetted wall evaporator to produce a mixture of approximately 46% P₂O₅. This acid mixture is continuously re-circulated throughout the system.

The feed going to distributing trough R usually runs approximately 44% P₂O₅ and is composed of acid from tank E and incoming dilute acid introduced via inlet F. It is preferred to introduce the feed tangentially at several points in order to maintain an acid velocity within the trough capable of preventing settling out of solids or the separation of foam. Another feature of the novel combination wetted wall evaporator and quenching tower is the prevention of the accumulation of solids within the tower by maintaining a constant flow of acid down the walls and across the sloping bottoms S-1 and S-2. Any separation of solids will take place within the operating tank where they can be readily disposed of. For this purpose two identical operating tanks E will be provided for alternate operation and for disposal.

A direct fired hot gas generator A is arranged to fire downwardly into wetted wall evaporator B and to liberate about 30,000,000 B. t. u./hr. It is preferred to effect complete combustion of the fuel and the emergence of incandescent gases. In practice, however, complete combustion does not always occur and intermittent emergence of flame or incandescent gases occur. However, actual tests have shown that it is not necessary to have a burning flame in the evaporator to accomplish the effective and complete evaporation and concentration described herein. Although any suitable fuel may be used, it is preferred to use Bunker "C" fuel oil which is the source of the heat required for evaporation. The hot gas generator is to be equipped with two separate blowers P and Q to provide primary air P for combustion and secondary air Q for temperature control. In this manner, an extremely flexible control of thermal conditions is provided. Temperature at the upper zone of the wetted wall evaporator can thus be adjusted to the optimum operating conditions, which are approximately as follows:

Inlet gases to wetted wall evaporator are at approximately 2600° F., with exit gases of the order of about 35,520 C. F. M. at about 700° F., with a duct C velocity of about 14.2 ft./sec. into quenching tower D. Exit gases from the quenching tower of the order of about 24,040 C. F. M. are at about 230° F., and a duct J velocity of about 14.2 ft./sec. is provided into a scrubber system comprising towers L-1, L-2, and L-3. This scrubber system is designed for the recovery of fluoride gases evolved during the process of concentration of the phosphoric acid.

In the scrubber system using co-current and countercurrent flow, water is sprayed into tower L-3 and descends downwardly and scrubs the upwardly rising gases. From tower L-3, the water emerges at the bottom as weak fluosilicic acid and is pumped to sprays in tower L-2. The effluent from tower L-2, stronger now in fluosilicic acid, combines with the effluent from tower L-1. This combined effluent from towers L-1 and L-2 is then circulated through sprays in tower L-1. The temperature of the water sprayed into tower L-3 varies between about 70 and about 80 degrees F. The approximate requirements for this water is about one gallon of water to each 1700 cu. ft. of gas. The volume of water can be varied to make acids of various strengths.

Fluosilicic acid (H₂SiF₆) which is evolved in the form of silicon tetrafluoride (SiF₄) and hydrogen fluoride (HF) in the evaporator is absorbed by the water in this countercurrent system to form weak fluosilicic acid in the scrubber system as follows:

$$SiF_4 \text{ (gas)} + 2HF \text{ (gas)} = H_2SiF_6 \text{ (liquid)}$$

This reaction occurs in all three towers L-1, L-2, and L-3. In this manner, gases are scrubbed with acid and water sprays in the towers and the fluorides are recovered as a weak solution of H₂SiF₆.

After scrubbing, the gases are released to the atmosphere out of stack M, on the order of about 21,960 C. F. M. saturated at about 170° F. These gases are substantially free of P₂O₅ and fluorides.

Gas circulation throughout the system is accomplished by an induced draft fan K which is located between the scrubber system and exit stack M. This fan is controlled for variable speed with a maximum capacity of about 35,000 C. F. M. at a pressure differential of about 4.5 inches of water. Its setting can be adjusted so as to maintain a slightly reduced pressure within the wetted wall evaporator B in order to avoid heat losses out of the annular space O at the top of the wetted wall evaporator.

The over-all capacity of the equipment is designed, for example, for the concentration of about 500, say 406 tons, of about 20%, (e. g. about 22%), of P₂O₅ acid to about 200 tons, (e. g. about 187.5 tons) of about 50%, (e. g. about 47.6%) of P₂O₅ acid per 24 hours, when carrying the present invention into practice and when operating with the following approximate quantities of acid:

| Item | Approximate Concentration | Approximate Rate |
|---|---|---|
| Weak phosphoric acid feed | (22% P₂O₅) | 564 lbs. per min. |
| Feed to distributor trough | (44% P₂O₅) | 7,069 lbs. per min. (Max.) |
| Discharge from Wetted Wall Evaporator | (45.4% P₂O₅) | 6,864 lbs. per min. (Max.) |
| Quenching Tower Feed | (46% P₂O₅) | |
| Quenching Discharge | (47.6% P₂O₅) | 2,631 lbs. per min. (Max.) |
| Recirculation | | 2,273 lbs. per min. (Max.) |
| Product | | 261 lbs. per min. |

The boiling points of the various concentrations of phosphoric acid in impure state from the feed trough (44%) to the quenching discharge (47.6%) are given approximately as follows:

| Concentration | Boiling Point |
|---|---|
| | °F. |
| 44% P₂O₅ | 261.5 |
| 45% P₂O₅ | 262.4 |
| 46% P₂O₅ | 263.3 |
| 47% P₂O₅ | 264.2 |

During the process the acid is maintained below its boiling point whereby concentration takes place throughout substantially the entire volume of acid without localized dehydration and losses.

Now referring more particularly to Figs. 2 to 4, the following is a description of the novel combination wetted wall evaporator and quenching tower:

Primary and secondary combustion air is furnished to oil burner and combustion chamber A. This burner is fired with Bunker "C" oil with an oil pump (not shown). The temperature is about 2600° F. and is produced by the burning of oil at the outlet of combustion chamber A. Additional air is drawn into the wetted wall tower B through the annular space O by means of an induced draft fan K (see Fig. 2). The hot gas flows down the wetted tower B where it contacts a film of acid flowing down the wetted wall N. Approximately two-thirds of the water evaporated from the phosphoric feed acid (44% $P_2O_5$) is evaporated in this tower and the temperature of the combustion gases is reduced to about 700° F. before leaving the wetted wall tower B by means of the exit duct C.

Entering the quenching tower D, the 700° F. gas contacts a spray of phosphoric acid containing an equivalent of 46% $P_2O_5$ from the acid spray Z-1. The phosphoric acid is pumped to the spray Z-1 by the pump I from the operating tank E. Approximately one-third of the total water evaporated from the feed acid (44% $P_2O_5$ equivalent) is evaporated in the quenching tower D. The hot gases containing little or no phosphoric acid mist and laden with fluoride-containing gases, such as $H_2F_2$ and $SiF_4$, leave the quenching tower D through the duct J where they enter the fluorine products scrubbing towers L-1, L-2, and L-3 (see Fig. 1). The scrubber system is a combination of co-current and countercurrent type. For example, in towers L-1 and L-3, the gases flow co-current with the acid spray and water spray, respectively, while in tower L-2 the gases flow countercurrent to the acid spray.

Weak phosphoric acid feed is introduced into the system through inlet valve and line F where it combines with the re-circulated acids from tank E which is a combination of the acids from the towers B and D. The acids are fed to the feed distributing trough R which distributes the weak acid in an even film over the wall N of the wetted wall tower B, in such a ratio as to produce an acid of strength equivalent to about 44% $P_2O_5$, by the pump M. After flowing down the wetted wall the acid in tower B flows across the inclined bottom S-1, to circulating tank E through outlet pipe U.

From circulating tank E, the combined acids from the wetted wall tower B and quench tower D with a $P_2O_5$ equivalent of approximately 46% is pumped to the acid spray Z-1 in the quenching tower D where approximately one-third of the total water is evaporated. The acid from the spray leaves the quenching tower D across the sloping bottom S-2 through an outlet pipe X where a portion is drawn off as a product through trough T—R. The remaining acid containing approximately 47.6% $P_2O_5$ equivalent enters circulating tank E.

The reactions occurring in the wetted wall tower and the quenching tower may be represented as follows:

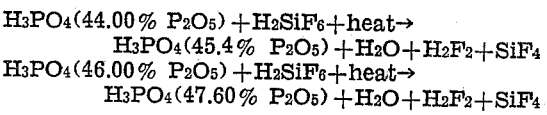

It is to be observed that in carrying the invention into practice the acid film on the wall of the wetted wall evaporator B is continuous and is necessarily so all the time the unit is in operation. Since large volumes of acid are circulated over the wetted wall, the change in concentration of the acid during one pass is slight and therefore variation of the thickness of the acid film on the wetted wall due to concentration changes is slight and practically immeasurable. The thickness of the film can be varied, however, by varying the output of the acid pump supplying acid to the wetted wall. The thickness of this film is limited by the necessity of keeping all portions of the wall wetted at all times. It is preferred to have the film sufficiently thick to accomplish this objective. On the other hand, the thickness may be increased as much as desired provided a true film were maintained. Any breaking and raining down of the acid is not desired and is preferably not tolerated.

Although the present invention has been described in conjunction with certain preferred embodiments, it is to be understood that modifications and variations may be resorted to without departing from the spirit and scope of the invention, as those skilled in the art will readily understand. Thus, fuel can be burned at the bottom of the wetted wall evaporator and the hot burning and/or incandescent gases can be caused to flow countercurrent to the downwardly flowing film of acid on the inside wall of the evaporator and then the hot gases can be taken off the top of the evaporator and carried into the quenching tower where the gases can be caused to flow co-current with the sprayed acid. Such variations and modifications are to be considered within the purview of the application and the scope of the appended claims.

I claim:

1. The improved process of concentrating liquid phosphoric acid from about 20% $P_2O_5$ to about 50% $P_2O_5$ with a small loss of phosphorus pentoxide which is evolved to the atmosphere as a dense white cloud of phosphoric acid mist in conventional concentration comprising introducing a feed of weak liquid phosphoric acid to be concentrated having a concentration of about 22% $P_2O_5$, mixing said liquid acid with recirculation acid having a concentration of about 46% $P_2O_5$ to form a liquid acid mixture having a concentration of about 44% $P_2O_5$, introducing said liquid acid mixture tangentially to a wetted wall distributing trough at several points in order to maintain a liquid velocity within the trough capable of preventing settling out of solids and separation of foam, causing said liquid acid mixture to flow from said trough uniformly over a wetted wall as an uninterrupted stream having a continuous surface film, subjecting said liquid acid to the direct action of hot burning gases having a high temperature of the order of about 2000° F. to evaporate a major portion of water to be evaporated and to concentrate said liquid acid mixture to about 46% $P_2O_5$ for recirculation without localized volatilization and dehydration and without substantial losses of $P_2O_5$ normally evolved in dense white clouds of phosphoric acid mist in conventional concentration, and spraying recirculation acid as a downwardly falling liquid spray countercurrent to rising hot gases having a temperature not higher than 700° F. to evaporate a minor portion of water to be evaporated and to produce a concentrated liquid phosphoric acid having a concentration of about 47.6% $P_2O_5$, without the emission of a dense white cloud of phosphoric acid mist and without the loss of phosphorus pentoxide.

2. The improved process of concentrating liquid phosphoric acid from about 20% $P_2O_5$ to about 50% $P_2O_5$ with a small loss of phosphorus pentoxide which is evolved to the atmosphere as a dense white cloud of phosphoric acid mist in conventional concentration comprising providing a feed of a liquid acid mixture having a concentration of about 44% $P_2O_5$ composed of weak phosphoric acid to be concentrated having a concentration of about 22% $P_2O_5$ and recirculation acid having a concentration of about 46% $P_2O_5$, introducing said liquid acid mixture to a wetted wall distributing trough, causing said liquid acid mixture to flow from said trough uniformly over a wetted wall as an uninterrupted stream having a continuous surface film, burning fuel oil to produce downwardly fired flame and hot gases and to liberate about 30 million B. t. u. per hour, adjusting primary air and secondary air in the burning of fuel oil to control the temperature of said hot gases at the inlet to a high temperature higher than about 700° F. and up to about 2600° F., subjecting said liquid acid to the direct action of said hot burning gases to evaporate a major portion of water to be evaporated, to concentrate said acid mixture to about 46% $P_2O_5$ for recirculation without localized volatilization and dehydration and without substantial losses of $P_2O_5$ normally evolved in dense white clouds of phosphoric acid mist in conventional concentration, and to reduce the temperature of said hot gases to about 700° F. as exit gases, and spraying recirculation acid as downwardly falling liquid spray and counter-current to a rising stream of said hot exit gases having a temperature lower than 700° F. to evaporate a minor portion of water to be evaporated, to produce liquid concentrated phosphoric acid having a concentration of about 47.6% $P_2O_5$ and to reduce the temperature of said rising stream of hot exit gases to about 230° F., without the emission of a dense white cloud of phosphoric acid mist and without the loss of phosphorus pentoxide.

3. The improved process set forth in claim 2 in which the hot exit gases are treated in a scrubber system to remove silicon tetrafluoride and hydrogen fluoride and to produce fluosilicic acid and to progressively reduce the temperature of the hot gases to about 170° F. for discharge to a stack.

BURDETTE W. BELLINGER.

REFERENCES CITED

The following references are of record in the file of this patent:

UNITED STATES PATENTS

| Number | Name | Date |
|---|---|---|
| 1,593,514 | Suchy | July 20, 1926 |
| 1,597,984 | La Bour | Aug. 31, 1926 |
| 2,026,519 | Curtis | Jan. 7, 1936 |
| 2,091,898 | Weber | Aug. 31, 1937 |
| 2,141,773 | Strathmeyer | Dec. 27, 1938 |
| 2,327,039 | Heath | Aug. 17, 1943 |
| 2,369,791 | Moore | Feb. 20, 1945 |